United States Patent [19]

Maeda et al.

[11] Patent Number: 5,377,167
[45] Date of Patent: Dec. 27, 1994

[54] RECORDING/REPRODUCING DEVICE

[75] Inventors: Shigemi Maeda, Yamatokoriyama; Shigeo Terashima, Tenri, both of Japan

[73] Assignee: Sharp Kabushiki Kaisha, Osaka, Japan

[21] Appl. No.: 122,172

[22] Filed: Sep. 17, 1993

Related U.S. Application Data

[63] Continuation of Ser. No. 928,651, Aug. 17, 1992, abandoned, which is a continuation of Ser. No. 446,432, Dec. 5, 1989, abandoned.

[30] Foreign Application Priority Data

Dec. 29, 1988 [JP] Japan ................. 63-331005

[51] Int. Cl.$^5$ .............................................. G11B 7/00
[52] U.S. Cl. ............................... 369/47; 369/48; 369/49; 369/58; 369/32
[58] Field of Search ................ 369/32, 30, 33, 56, 369/58, 59, 44.26, 275.1, 275.2, 275.3, 2, 3, 47, 48, 49, 50, 54, 58, 124; 360/72.1, 72.2, 8, 27

[56] References Cited

U.S. PATENT DOCUMENTS

| | | | |
|---|---|---|---|
| 4,858,217 | 8/1989 | Fujiie et al. | 369/59 |
| 4,862,439 | 8/1989 | Ando et al. | 369/30 |
| 4,942,567 | 7/1990 | Shiba | 369/44.21 |

FOREIGN PATENT DOCUMENTS

| | | |
|---|---|---|
| 0164131 | 12/1985 | European Pat. Off. . |
| 0248536 | 12/1987 | European Pat. Off. . |
| 0281415 | 9/1988 | European Pat. Off. . |
| 0282209 | 9/1988 | European Pat. Off. . |
| 0292917 | 11/1988 | European Pat. Off. . |
| 0310678 | 4/1989 | European Pat. Off. . |
| 0346979 | 12/1989 | European Pat. Off. . |
| 63-222379 | 9/1988 | Japan . |
| WO8808197 | 10/1988 | WIPO . |

OTHER PUBLICATIONS

Japanese Abstract vol. 10, No. 369; 10 Dec. 1986, JP-A-61 162878, p. 525.
Japanese Abstract vol. 9, No. 269; Oct. 26, 1985, JP-A-60 115067, p. 400.
Japanese Abstract vol. 9, No. 144; Jun. 19, 1985, JP-A-60 022791 p. 365.
Japanese Abstract vol. 12, No. 34; Feb. 2, 1988, JP-A-62 185289, p. 662.
The English Abstract of Japanese No. 63-222379; Sony Corp.
The Art of Digital Audio; John Watkinson; Jan. 1988; p. 1 and pp. 441 to 487.
Zukai Compact Disc Dokuhon (Illustrated Compact Disc Handbook) 4/25/1988.

*Primary Examiner*—Aristotelis Psitos
*Assistant Examiner*—Muhammad N. Edun

[57] ABSTRACT

A recording/reproducing device for recording and reproducing on a rewritable recording medium which comprises absolute addresses, a sound information recording region for recording sound information entered thereto from outside and a TOC area for recording additional information on the sound information recorded in the sound information recording region. The device includes an optical head as well as a magnetic coil for recording silencing information or fading information in the TOC area, each of which respectively specifies that a desired range in the sound information recording region should be erased or a fade-in/fade-out operation adjacent to the recording start/end position of desired sound information should be executed in reproducing sound information in the sound information region, a TOC memory wherein the silencing information or the fading information read from the TOC area is stored when the recording medium is placed in the device, and a muting circuit which performs the silencing operation within the range specified by the silencing information stored in the TOC memory or a fading circuit which performs the fade-in/fade-out operation according to the fading information stored in the TOC memory.

50 Claims, 9 Drawing Sheets

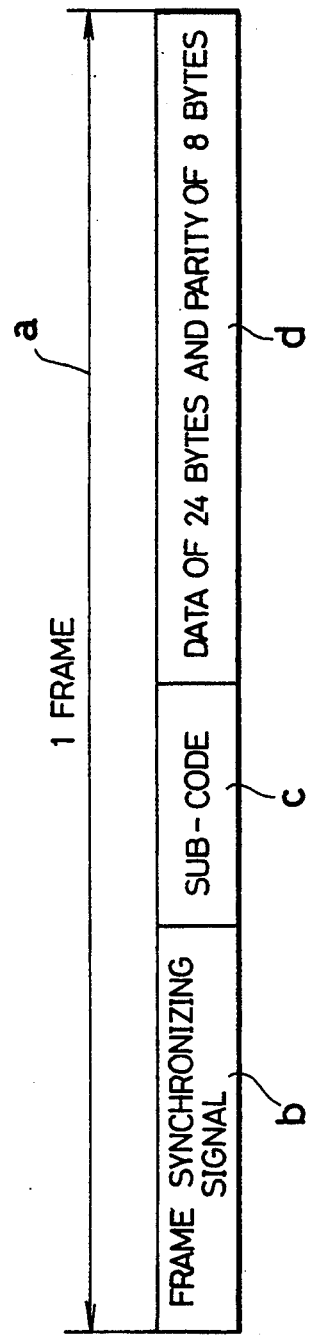
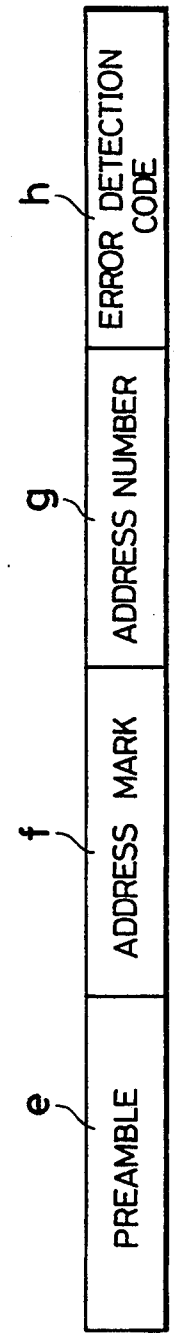
FIG. 3
FIG. 4

(a)

(b)

(c)

RECORDING/REPRODUCING DEVICE

This application is a continuation of application Ser. No. 07/928,651 filed on Aug. 17, 1992, now abandoned; which was a continuation of Ser. No. 07/446,432 filed on Dec. 5, 1989, now abandoned.

FIELD OF THE INVENTION

The present invention relates to a recording/reproducing device for recording as well as reproducing on a recordable recording medium which comprises absolute addresses.

BACKGROUND OF THE INVENTION

Conventionally, compact disks (hereinafter called CD's) are known as a disc shaped recording medium to record digitized information such as for music programs etc.

These CD's are only used for reproducing and a plurality of melodies are successively recorded on the disk. If the CDs are for music programs, they are also provided with a so-called lead-in region at the innermost track wherein an area called TOC (Table Of Contents) is set in order to record recording start positions etc. for each melody therein. In a reproducing device, when a CD is placed into it, the number as well as the recording start position for each melody is defined from the records of the CD placed in by reproducing the information recorded in the TOC area, and during reproduction, access to optional melodies is performed at high speeds by using the information of this TOC area.

Moreover, in the CD's used only for reproducing, each melody is usually separated by a silent part of a several seconds interval so that listeners are not displeased when melodies are reproduced successively. Depending on the contents of melodies, a fade-in process for increasing volume gradually at the starting of a melody as well as the fade-out process for decreasing volume at the end of a melody is provided in the reproducing device, resulting in high quality music for listeners.

Since the above mentioned CD's are used only for reproducing, a recording/reproducing device wherein users can optionally record music information etc. is very desirable. One example of such a device is a recording/reproducing device using a magneto-optical disk on which a rewriting process is available.

In the recording/reproducing device using above-mentioned rewritable disk, such a device is suggested wherein; absolute addresses having uneven-shaped patterns are preset when the disk was formed in order to rotatively control the disk also in the recording process by using CLV (Constant Linear Velocity) as is currently used in CD players in the recording and reproducing operations, said absolute addresses are used to access an unrecorded part as well as to perform the CLV control; and the same signal format as for the CD is used to record data on the disk.

Furthermore, in above-mentioned rewritable disk, the TOC area is also preset and when recording for music information etc. is finished, the absolute addresses for the recording start positions for the music information are recorded in said TOC area by correlating each address with the respective music numbers.

In the above-mentioned rewritable disk, rerecording is possible at an optional position in a program area, so a proper pause is not always provided between melodies as is conventional CD's. For example, as is shown in FIG. 10, an unrecorded part V for a long period sometimes exists between the first melody M1 and the second one M2. When music information with an arrangement shown in FIG. 10 is successively reproduced and in case the unrecorded part V to be reproduced as a silent part after the reproduction of the first melody M1 lasts for as long as more than seven seconds, listeners sometimes feel uncomfortable.

Furthermore, as is shown in FIG. 11 (a), in a disk wherein music programs containing from the first melody M1 to the fourth one M4 have been recorded, when another melody M2' is rerecorded at the beginning of the second melody M2, if M2' is shorter than M2 as is shown in FIG. 11 (b), the last part of the previous second melody M2 remains between M2' and the third one M3, causing a problem in that an unnecessary last part of M2 is reproduced after the reproduction of M2'. On the other hand, as is shown in FIG. 11 (c), in case M2' is longer than M2, the last part of the previous third melody M3 remains between M2' and the fourth melody M4, reproducing an unnecessary last part of M3 following after M2' in the subsequent reproduction.

Moreover, in reference to FIG. 11 (c), when the melodies on and after the third one M3 are dealt as unnecessary ones only to remain the first one M1 and the second one M2', it is troublesome that in the continuous reproducing, the melodies on and after the third one M3 will be reproduced automatically unless the device is stopped at the end of M2'.

Furthermore, when the timing to start recording and that to start playing music happen almost at the same time, or when broadcasting is used as a recording source, as is shown in FIG. 12, there may be hardly any pause between the first melody M1 and the second one M2. In that case, when the continuous reproducing is performed, M2 is reproduced immediately after M1, making the listeners feel uncomfortable.

As an additional problem, it is difficult to carry out such fade-in/fade-out processes as can be performed in the conventional CD reproduction in recording music information in the above-mentioned recording/reproducing device. More specifically, in principle the fade-in/out processes are carried out by increasing the volume level gradually at the beginning of the recording and decreasing it gradually at the end, but in recording for FM broadcasting etc., for example, it is difficult to predict the starting or ending of music, so adjusting the volume in a proper timing is very hard.

On the other hand, unlike the case of broadcasting, when CD's, records, DAT's (Digital Audio Tape) or the like are used as media for recording source, the above-mentioned fade-in/out processes can be repeatedly operated until a perfect process is obtained, but in the actual operation, rather complicated procedures are necessary, because the actuation for reproducing a recording source and that for recording/reproducing device must be started at the same time. Accordingly, it has been difficult for users in general to perform the fade-in/out processes at the same time while recording.

Moreover, due to mistaken operations etc., recording might be initiated from the middle of a melody or might be terminated in the middle of one because of the disk capacity's shortage. In that case, the reproduction of the music performance might be suddenly started or be ended in the middle, making the listeners feel displeased. When broadcasting is used as a recording source, announcements etc. might disturb the recording of music.

SUMMARY OF THE INVENTION

It is an object of the present invention to provide a recording/reproducing device wherein reproduction of unnecessary sound information can be avoided in reproducing sound information and a proper pause can be made between melodies.

It is another object of the present invention to provide a recording/reproducing device which supplies high quality sound to the listeners and does not require any difficult adjusting operations for the volume while recording.

It is still another object of the present invention to provide a recording/reproducing device in use for a recording medium comprising a TOC area and by recording silencing information or fading information in said area as additional information, the same silencing or fade-in/fade-out processes are performed in every reproduction of the recording medium without any troublesome repeated operations for instructions by the use of operation keys.

In order to achieve the above-mentioned objects, the present invention provides a recording/reproducing device wherein recording and reproducing are performed on a rewritable recording medium comprising absolute addresses, sound information recording region to record sound information entered from outside and a TOC area to record additional information on the sound information recorded in the sound information recording region, and which is characterized in comprising recording means which record silencing information for instructing a desired range to be erased in reproducing the sound information recorded in the sound information recording region in the TOC area, memory means wherein the silencing information read from the TOC area is stored when the recording medium is placed into the device, and silencing means which erases the recordings within the range instructed by the silencing information stored in the said memory means when the sound information is reproduced.

According to the above-mentioned composition, in reproducing the sound information recorded in the sound information recording region, the silencing means erases the sound within the range instructed by the silencing information, so reproduction of unnecessary sound information can be avoidable and for example, setting of proper pauses between melodies can be carried out. Moreover, since the silencing information is recorded in the TOC area in the recording medium as the additional information, the silencing information is kept in the recording medium even if the medium is taken out from the recording/reproducing device. Accordingly, once silencing information is set, the same silencing process can be performed when the recording medium is reproduced unless the information is cancelled or changed.

This invention relates to another recording/reproducing device which performs recording and reproducing on a rewritable recording medium comprising the absolute address to carry out the fade-in/fade-out process in reproduction, a sound information recording region to record sound information entered from outside and a TOC area to record additional information on the sound information recorded in the sound information recording area, and which is characterized in containing recording means to record fading information which indicate to perform the fade-in/out process adjacent positions to start/stop recording desired sound information in reproducing the sound information recorded in the said sound information recording area in the above-mentioned TOC area as additional information, a memory means to store the above-mentioned fading information read from the TOC area when a recording medium is placed in, and fading means to perform the fade-in/out process based on the fading information stored in the said memory means when the sound information is reproduced.

In accordance with the above-mentioned composition, since the fade-in/fade-out process is carried out on a desired melody by the fading means based on the fading information in reproducing sound information, high quality music can be provided. Moreover, since the setting of the fading information can be applied after recording, difficult adjusting operations for the volume in recording sound information are avoidable. Furthermore, since the fading information is also recorded in the TOC area as the additional information, the fading information is kept in the recording medium even if the medium is taken out from the recording/reproducing device. Accordingly, once fading information is set, the same fade-in/fade-out processes are carried out unless the fading information is cancelled or changed.

As above-mentioned rewritable recording medium, an optical card as well as a magnetic tape may be used.

As above-mentioned rewritable recording medium, a rewritable disk may be used which performs recording or erasing by using magneto-optical, phase change function or the like.

As above-mentioned rewritable recording disk, magneto-optical disk having a format of CD may be used.

For a fuller understanding of the nature and advantages of the invention, reference should be made to the ensuing detailed description taken in conjunction with the accompanying drawings.

BRIEF DESCRIPTION OF THE DRAWINGS

FIG. 3 is a schematic illustration showing a format of magneto-optical signal.

FIG. 4 is a schematic illustration showing a format of an absolute address.

FIG. 7 is a block diagram showing the composition of a recording/reproducing device.

FIGS. 8 (a)–8 (d) are schematic illustration showing input/output signals to/from a fading circuit.

FIG. 9 is a schematic illustration showing an example of recording conditions of music programs in the program area.

DETAILED DESCRIPTION OF THE EMBODIMENTS

One embodiment of the present invention is described in detail with reference to FIGS. 1 to 6 as follows;

A recording/reproducing device in accordance with the embodiment is provided to perform recording and reproducing of music programs by the data format standardized in CD's using a magneto-optical disk.

Figure 2:
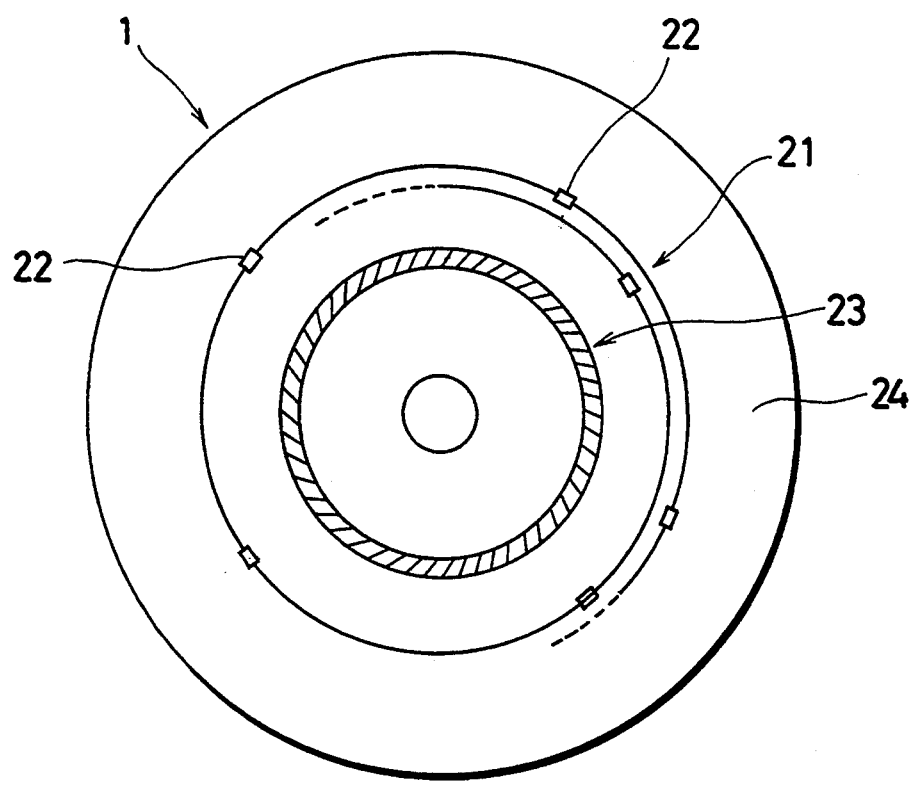
FIG. 2 is a schematic plane view showing a magneto-optical disk.

As is shown in FIG. 2, on a transparent substrate for a magneto-optical disk 1 as a rewritable recording medium, there is provided in a spiral-shaped track 21, and absolute addresses 22 are formed along the track 21 in pit-like shapes with predetermined intervals.

In an innermost region of the track 21, there is formed TOC area 23 made of a magneto-optical recording layer in which additional information for each music program recorded in a program area 24 is recorded as will be described below, and there is formed a program area 24 on the magneto-optical recording layer as a sound information recording region to record music programs, along the track 21 outside of the TOC area 23.

A data format for the information recorded in the program area 24 and the TOC area 23, is the same format as is used in conventional CD's used only for reproducing. Accordingly, as shown in FIG. 3, the information a corresponding to one frame includes a frame synchronizing signal b, a sub-code c wherein melody number, time information etc. are stored according to each data field d described later and a data field d including 24 bytes for data of music programs and the like with additional 8 bytes for parity to detect and correct errors. The above-mentioned information a is successively recorded in the program area 24 and the TOC area 23. Moreover, in the program area 24, the contents of the sub-code c can be optionally set.

On the other hand, as shown in FIG. 4, the absolute address 22 consists of a preamble e for synchronizing reproduction, an address mark f to indicate the initiation of the absolute address 22, an address number g to show the address incrementing one by one from the innermost track of the magneto-optical disk 1 (Actually shown by the absolute time of unit one second) and an error detecting code h to detect errors in searching for the address number g. The above-mentioned absolute addresses 22 have fixed intervals between them so that one address can be reproduced every second by the fixed linear velocity when the information in the magneto-optical disk 1 is reproduced.

Figure 1:
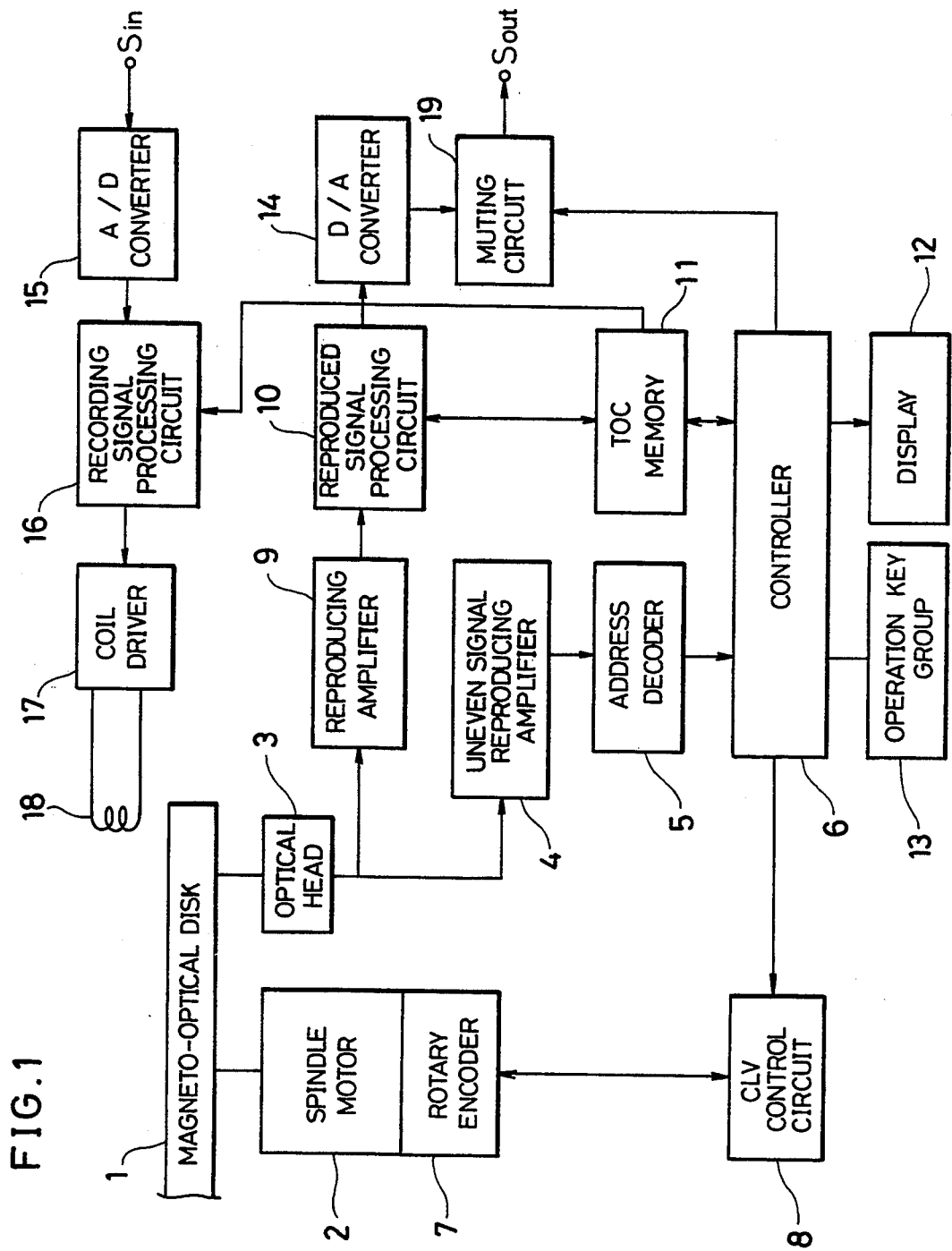
FIG. 1 is a block diagram showing the composition of a recording/reproducing device.

One example of a recording/reproducing device for recording to and reproducing from the above-mentioned magneto-optical disk 1 is shown in FIG. 1.

The magneto-optical disk 1 is rotatively driven by a spindle motor 2. By the side of this magneto-optical disk 1, there is supported an optical head 3 which performs recording and reproducing of the information including additional information inside the magneto-optical disk 1 by applying light beam to the magneto-optical disk 1. The optical head 3 together with a magnetic coil 18 to be described later serves as recording means.

Signal elements (hereinafter called uneven signal) corresponding to the respective absolute addresses 22, which actually have uneven pit-like shape, of the reproduced information through the optical head 3 are amplified by an uneven signal reproducing amplifier 4. The amplified uneven signals are sent to an address decoder 5 and the value of the absolute address is recognized therein, and then the value is informed to a controller 6 which controls the whole recording/reproducing device. The controller serves as silencing means together with a muting circuit to be described later.

A rotary encoder 7 secured on the spindle motor 2 releases a fixed number of pulses per every one revolution of the spindle motor 2 to a CLV control circuit 8.

The CLV control circuit 8, while detecting the revolving speed of the spindle motor 2 by the rotary encoder 7, by using the information sent from the controller 6 on the position of the optical head 3 in the direction of a disk radius, controls the revolving speed of the spindle motor 2 so that the linear velocity of the optical head 3 for the magneto-optical disk 1, that is to say, the travel speed of the optical head 3 along the track 21 may be held constant.

Magneto-optical signal elements corresponding to each music program etc. of the information reproduced by the optical head 3 are amplified by a reproducing amplifier 9 and sent to a reproduced signal processing circuit 10. The reproduced signal processing circuit 10 has a composition wherein the reproduced data for music programs etc. having a data format shown in FIG. 3 are processed, needed data are taken out and arranged, and a correction process for the errors of the reproduced data is performed if necessary.

The data stored in the TOC area 23 of the data processed by the reproduced signal processing circuit 10 are stored in memory means, TOC memory 11. The number, melody start position, etc. of each melody stored in TOC memory 11 after read from the TOC area 23 are read by the controller 6 and displayed on a display 12 as necessary. Moreover, various instructions by the user are performed by an operation key group 13 and read by the controller 6.

Digital data sequences from the reproduced signal processing circuit 10 are converted into analog signals by a D/A converter 14 and released to extend receivers as an analog output signal, $S_{out}$ through a muting circuit 19 as muting means.

On the other hand, music programs entered into the device from outside as analog input signals, $S_{in}$ are converted into digital signals by an A/D converter 15 and sent to a recording signal processing circuit 16.

The recording signal processing circuit 16 generates recording signals after converting music programs from the A/D converter 15 or various information from the TOC memory 11 into data format shown in FIG. 3. In accordance with recording signals from the recording signal processing circuit 16, a coil driver 17 drives a magnetic coil 18 as recording means so that it can apply external magnetic fields corresponding to the record signals on the magneto-optical disk 1. Moreover, the muting circuit 19 carries out a silencing processing according to the silencing information from the controller 6 in reproducing music programs.

The following description deals with operations for the disk recording/reproducing device.

When the magneto-optical disk 1 is placed on the spindle motor 2, the controller 6 drives the optical head 3 to a radial position corresponding to the TOC area 23 by controlling an optical head transfer unit (not shown in Fig.) and gives the radial position information corresponding to the above-mentioned radial position to the CLV control circuit 8.

In accordance with the radial position information for the optical head 3, the CLV control circuit 8 finds a revolving speed of the spindle motor 2 required in order to obtain a fixed linear velocity at that radial position and rotatively drives the magneto-optical disk 1 at the fixed linear velocity by controlling the spindle motor 2 so that its actual revolving speed detected by the number of the pulses from the rotary encoder 7 will have the same revolving speed as the above-mentioned revolving speed required.

Accompanying the revolution of the magneto-optical disk 1, as the absolute address 22 is read by the optical head 3, the address is released as reproduced signals, and after amplified by the uneven signal reproducing amplifier 4, the absolute address 22 is defined by the address decoder 5 and its corresponding value is entered in the controller 6.

In controlling the revolution of the spindle motor 2 in order to fix the linear velocity of the optical head 3 for the magneto-optical disk 1, when dispersions etc. of mechanical accuracy are taken into consideration, it is difficult to obtain an accurate fixed linear velocity because the radial position information for the optical head 3 is not necessarily exactly correlated with the actual radial position. However, linear velocity errors within which the absolute address 22 can be at least reproduced and discerned are acceptable.

Since the above-mentioned controller 6 successively sends accurate radial position information to the CLV control circuit 8 according to the value of the absolute address 22 from the address decoder 5, accurate control of the linear velocity by the CLV control circuit 8 can be performed whether or not the above-mentioned record signals are obtained in the subsequent operations.

The following description deals with recording for music programs.

Music programs entered from external sources as analog input signals $S_{in}$ are digitized by the A/D converter 15 and transformed into a fixed format by the recording signal processing circuit 16, thereby forming recording signals. According to these recording signals, the magnetic coil 18 is driven by the coil driver 17, applying magnetic fields corresponding to the recording signals onto the magneto-optical disk 1.

In recording operations, a comparatively high output of light beam from the optical head 3 is applied onto the magneto-optical disk 1, and then the coercive force is decreased in the localized parts on the magneto-optical disk where temperature rise occurs as a result of the light beam. Magnetization in the parts where the coercive force is decreased is reversed by the magnetic fields applied by the magnetic coil 18, thereby permitting the music programs to be recorded. Generally this method is called magnetic field modulation method and in this system, rewriting on an area already recorded is possible.

On the other hand, in reproducing the music programs recorded in the program area 24, as is known in prior art devices, polarizing elements conformable to the magnetizing direction of magneto-optical signals reproduced from the revolving magneto-optical disk 1 are detected by the optical head 3 and amplified by the reproducing amplifier 9. After that, the amplified signals are converted into digitized audio data by the reproduced signal processing circuit 10 and then into analog signals by the D/A converter 14, and are released as the analog signals, $S_{out}$ through the muting circuit 19.

The following description deals with operations for the recording/reproducing device on its TOC area 23 of the magneto-optical disk 1.

In the TOC area 23, there are recorded, for example, the number of each melody recorded in the program area 24 and the recording start position for each melody corresponding to the absolute address 22, as additional information. Moreover, in performing operations to be described later, silencing information on silencing processes is also recorded as additional information.

When the magneto-optical disk 1 is placed on the spindle motor 2, the controller 6 controls the system so that, as described before, the optical head 3 is driven to the TOC area 23, the magneto-optical disk 1 is revolved at a constant linear velocity to read the contents of the TOC area 23 therein and the information in TOC area 23, if there is any, is stored in the TOC memory 11.

The content of the information which is read from the TOC area 23 is then entered into the TOC memory 11 as shown in Table 1. The information is also displayed on display 12 by the controller 6.

TABLE 1

| Melody Number | Recording Start Position |
| --- | --- |
| 1 | 00'10" |
| 2 | 03'13" |
| 3 | 14'03" |

In the Table 1, the recording start position for each melody conforms to the time information given by the absolute address 22. By displaying the contents, as shown in Table 1 on the display 12, the user can recognize the music programs recorded on the recording medium. For example, if the user wants to reproduce the second melody, he/she can give an instruction to do so by using the operation key group 13, and then the controller 6 makes the optical head 3 access to the position, (03'31") which is specified by the absolute address 22 showing the recording start position for the second melody, thereby selecting the melody to be performed.

On the other hand, during the reproduction of a music program, depending on the contents of the TOC memory 11, the relative time of each melody (elapsed time for each melody since the reproduction has started) which is obtained by subtracting the value of the absolute address 22 at the recording start position from that of the absolute address 22 reproduced successively, is displayed on the display 12 together with the melody number. Moreover, a current reproducing position can be also displayed by the absolute time (the total elapsed time since the reproduction for the first melody has started) corresponding to the absolute address 22. In this way, by using the combination of the contents of the TOC memory 11 and the value of absolute address 22 reproduced successively, effective displays as well as the access operation for the optical head 3 can be performed without any special necessity for the information of sub-code c in the program area 24.

As for rewriting the contents of the TOC area 23 of the magneto-optical disk 1, the operation is performed by taking the same recording process as described above after converting the contents of the TOC memory 11 into each fixed format by the recording signal processing circuit 16 in the following occasions; wherein a recording for a music program is finished; or for example, the magneto-optical disk 1 is taken out from the spindle motor 2; or when the user requests it by the operation key group 13.

On the other hand, change of the contents in the TOC memory 11 is carried out in any one of the ways shown as follows except the case wherein the information is read from the TOC area 23.

(i) In the first way, the contents of the TOC memory 11 can be changed during the recording operation for a music program in the program area 24. For example, for a music program in the recording operation, its signal levels as well as running time is supervised when they are in analog or digital stage and if they meet the predetermined requirements, a judgement is made that there is an interval between the melodies. By defining the beginning of the interval as the ending position of the previous melody and the ending of the interval as the starting position of the next melody respectively, and also by incrementing the number of the melodies, whereby the contents of the TOC memory 11 are successively changed.

(ii) The second way is also carried out during the recording operation of a music program into the program area 24. In this way, for example, the user may judge whether or not there is an interval in the recording operation and by using the operation key group 13, he/she can instruct to change the contents of the TOC memory 11 in the same way as described in (i) above.

(iii) The third way is also carried out while music programs are being recorded in the program area 24. If recording sources for music programs are used, for example, CD, DAT (Digital Audio Tape), etc. which have sub-codes in their signals, information showing the melody number, recording start position, etc. for each music program is entered directly to the controller 6 by the sub-code and according to the information, the contents of the TOC memory 11 is changed.

The following description is given on input operation for silencing information.

For example, music programs recorded in the program area 24 are reproduced successively from the beginning thereof and while being reproduced, a predetermined key of the operation key group 13 is pressed at the part where the silencing operation will be applied, for example such a part the user Judges it is an interval between the melodies. Upon the predetermined key of the operation key group 13 being pressed, the controller 6 stores the value of the absolute address 22 which is being reproduced, in the TOC memory 11 as a start position for silencing operation and when the pressing of the key of the operation key group 13 is released, the controller 6 also stores the value of the absolute address 22 which is being reproduced, in the TOC memory 11 as an end position for the silencing operation. More specifically, the above-mentioned start/end positions for the silencing operation correspond to silencing information.

Moreover, in entering silencing information, in an actual operation, the part to which silencing instructions are given by the operation key group 13 is only necessary to be reproduced, so editing of the TOC memory 11 is possible in short time by using those functions such as melody-selection for melodies which need the silencing process or fast tape sending/rewinding or the like. Furthermore, since the above-mentioned input of silencing information is performed after recording music programs, the operation is easy and if the operation should be failed, it wouldn't cause any destruction of the recorded contents in the program area 24 because the information isn't stored in the program area 24, so successive re-input operation is possible.

In reproduction after entering the silencing information, the silencing process within the indicated range is carried out by the following actions; in which the controller 6 recognizes the silencing information stored in the TOC memory 11 and give instructions to the muting circuit 19 on the starting and ending for the silencing operation according to the absolute address 22 which is successively reproduced.

Figure 5:
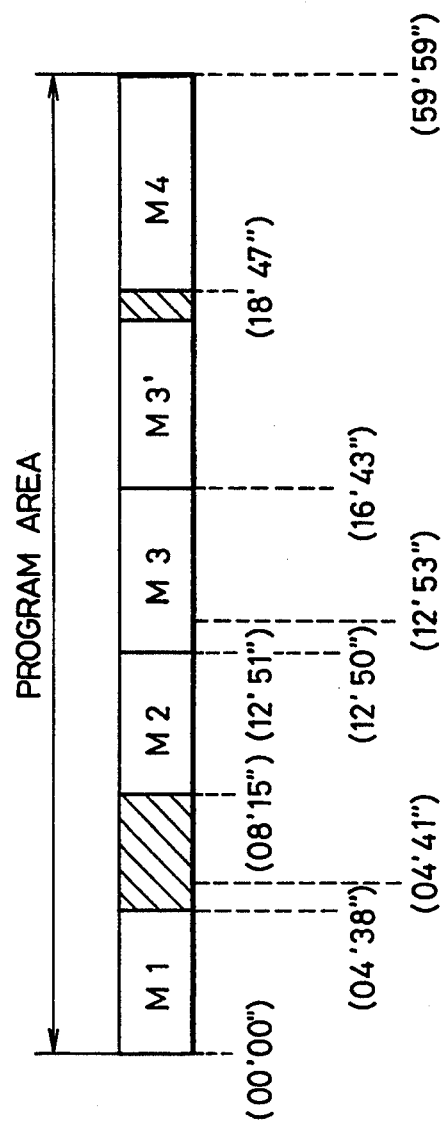
FIG. 5 is a schematic illustration showing an example of recording conditions of music programs in the program area.

Now, suppose music programs are recorded in the program area 24 as is shown in FIG. 5. In this case, in the TOC memory 11 there are stored the number and the recording start position for each melody as additional information as shown in Table 2. Moreover, in the TOC memory 11 there is also stored the silencing information entered by the above-mentioned procedures, for example shown in Table 3.

TABLE 2

| Melody Number | Recording Start Position |
|---|---|
| 1 | 00'00" |
| 2 | 08'15" |
| 3 | 12'51" |
| 4 | 18'47" |

TABLE 3

| No. | Silencing Start Position | Silencing End Position |
|---|---|---|
| 1 | 04'38" | 04'41" |
| 2 | 12'50" | 12'53" |
| 3 | 16'43" | 59'59" |

In a recording condition shown in FIG. 5, there exists a long unrecorded part after the first melody M1, and immediately after the second melody M2, there is re-recorded a new third melody M3 on the previous third melody M3'. Then, after the third melody M3, there still remains the rear part of the previous third melody M3'. Moreover, the fourth melody M4 has its recording ended in the middle of the melody due to shortage of the disk capacity. Reproduction of above-mentioned rear part of the previous third melody M3; as well as the fourth melody is usually unnecessary. In this case, in the setting of silencing information, a silencing time only for three seconds is specified from (04'38"), the end of the first melody M1, to (04'41") by the silencing information No. 1 shown in Table 3. Then, in reproducing, the controller 6 ensures, that immediately after the silencing process for three seconds is applied at the end of the first melody M1, the reproduction of the second melody M2 will be started. Moreover, since there is hardly any pause time between the second melody M2 and the third melody M3, a silencing time of three seconds is specified from (12'50"), the end of the second melody M2, to (12'53") by the silencing information No. 2. In reproducing, the controller 6 ensures that after the silencing process up to (12'53"), the reproduction of the third melody M3 is performed by going back to the recording start position (12'51") for the third melody M3, so as to not omit the beginning of the performance of the third melody M3 is omitted. Moreover, since the rear part of the previous third melody M3' as well as the fourth melody do not need to be reproduced, the part from (16'43"), the end of the third melody M3 to (59'59") wherein the program area 24 ends is specified as a silencing part by the silencing information No. 3.

Figure 6:
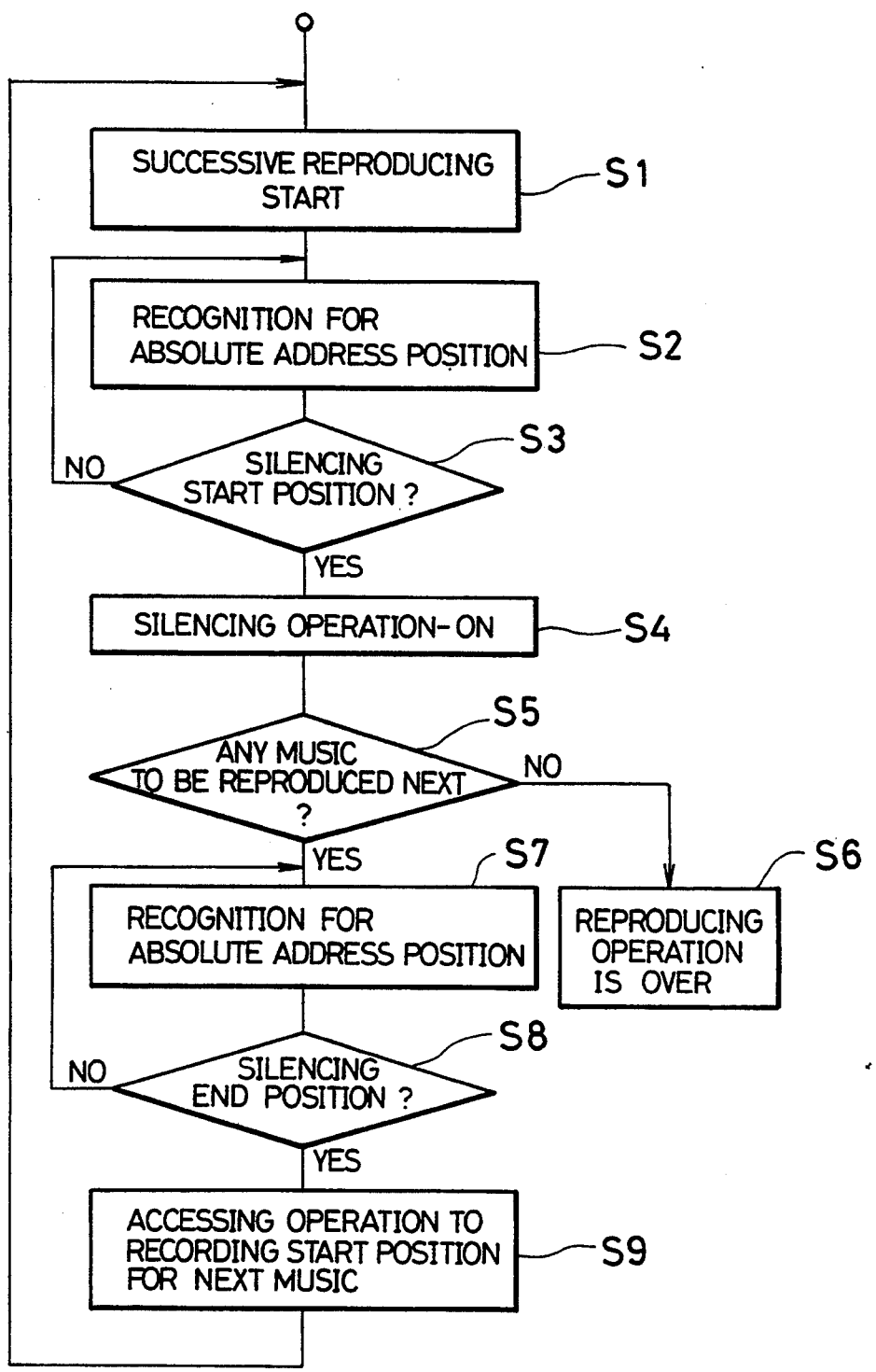
FIG. 6 is a flowchart showing the procedures for a successive reproduction accompanying a silencing operation.

According to a flowchart in FIG. 6, one way of operations in successive reproducing is described as follows.

In the recording/reproducing device, a successive reproduction of music programs is started (S1), and reproduced sound is released in order. Together with the output of the reproduced sound, absolute addresses 22 in the magneto-optical disk 1 are successively reproduced (S2), and it is monitored whether or not one of the value of those absolute addresses 22 corresponds to the value of the absolute address 22 showing the silencing start position which is specified by the silencing information. (S3) If none of those absolute addresses correspond to the silencing start position, the process S2 is repeated and the same monitoring is performed again and again until one of them corresponds to the silencing start position.

When the absolute addresses corresponds to the predetermined value for the silencing start position, a silencing operation is started by the muting circuit 19. (S4) Then, together with this silencing operation, monitoring is continuously performed whether or not there are any other melodies to be reproduced. (S5) The monitoring here is performed by determining whether or not there is any music program not included in the silencing part specified by the silencing information in the absolute addresses on and after the present value of the absolute address 22 in the program area 24. If there is no music program to be reproduced continuously, the reproducing operation is finished. (S6)

On the other hand, if there are other music programs to be reproduced, the absolute addresses 22 are recognized (S7), and a determination is made whether or not one of the values of the absolute addresses corresponds to the silencing end position. (S8) If none of them correspond the process S7 is repeated and the same monitoring is performed again and again until one of the absolute addresses reach the silencing end position. When one of the absolute addresses corresponds to the silencing end position, the optical head 3 is accessed to the recording start position for the next music program to be reproduced (S9) and the above-mentioned procedures from S1 are repeated.

By above-mentioned silencing process, a proper pause time is set between each melody, while the reproduction of unnecessary melody is avoided.

Furthermore, above-mentioned silencing information stored in the TOC memory 11 is also recorded in the TOC area 23 as additional information by the user's initiation at a proper stage of the operation. Accordingly, the silencing information is kept on the magneto-optical disk 1 even if it is taken out from the recording/reproducing device. When the disk is placed in the device next time, above-mentioned silencing information is read from the TOC area 23 and stored in the TOC memory 11, so the silencing information which is once entered into the TOC area 23 is available as long as it is not modified, and the preset silencing process is carried out every time the disk with the silencing information stored therein is reproduced.

In the above-mentioned example, for instance, a method is disclosed wherein if a silencing range overlaps with the beginning of the next melody like an interval between the second melody M2 and the third melody M3 as is shown in FIG. 5, access is made to the recording start position of the next melody after the silencing range is over, but instead of that, for instance, another method can be applied wherein the disk can be held in its reproducing operation for a certain amount of time corresponding to the silencing range between melodies. This holding operation can be executed, for example in the pause action by making a track-jump per one revolution of the disk as is performed in the conventional CD's only used for reproduction. In this way, a more accurate setting for the interval between melodies is available.

Moreover, in the above-mentioned example, silencing start positions as well as silencing end positions are defined as silencing information, however instead of that method, silencing start positions and silencing time may be defined.

Furthermore, in the above-mentioned preferred embodiment, the silencing operation by the muting circuit 19 is performed in the analog signal stage at the latter stage of the D/A converter 14, however the silencing operation may be performed in the digital signal stage at the former stage of the D/A converter Another embodiment of the recording/reproducing device according to the present invention is described as follows with reference to FIGS. 7 to 9.

Figure 7:
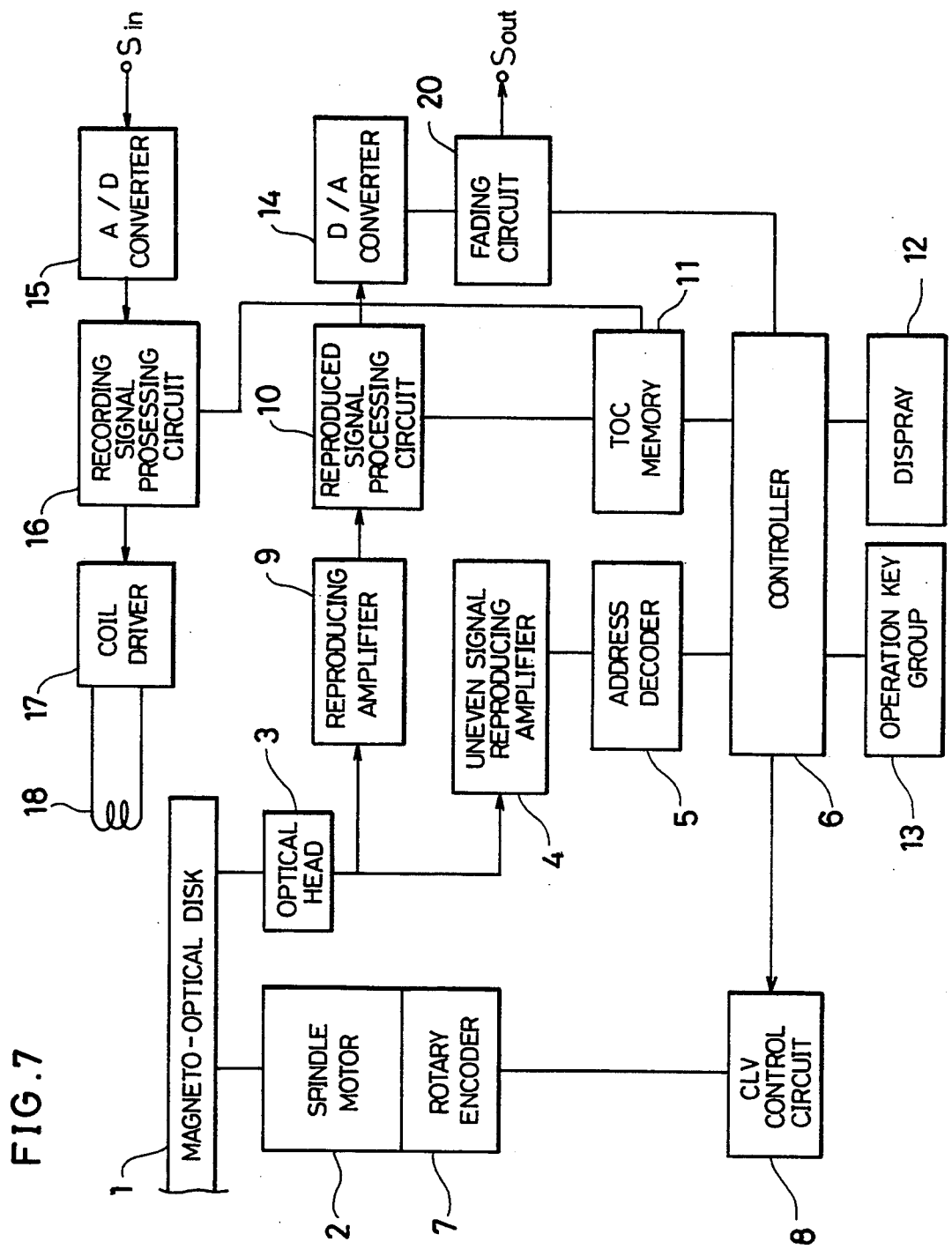
FIG. 7 to FIG. 9 show another preferred embodiment of the present invention.

Since the recording/reproducing device in accordance with this embodiment has almost the same composition as that in the first embodiment as is shown in FIG. 7, detailed description is omitted by giving the same reference numeral to each corresponding part. However, in this embodiment, a fading circuit 20 is installed instead of the muting circuit 19 in the above-mentioned embodiment, and the circuit serves as fading means for performing fade-in/fade-out process, together with the controller 6.

Moreover, the composition of magneto-optical disk 1 as well as data format etc. is the same as that in the first embodiment, and it has the same system in that the number and recording start position for each melody stored in a program area 24 are also recorded in a TOC area 23 as additional information, and when the disk is placed on a spindle motor 2, the contents of the TOC area 23 are reproduced to be stored in the TOC memory 11.

In this embodiment, when a music program is reproduced, as is the same in the first embodiment, music information released from the reproduced signal processing circuit 10 is released as reproduced music signals, $S_{out}$ through the fading circuit 20 after being converted into analog signals by the D/A converter 14.

The following description deals with the operation of the fading circuit 20.

In order to simplify the description, analog input signals to the fading circuit 20 are shown as a successive single signal with a certain constant level as is shown in FIG. 8(a). When signals instructing to fade in shown in FIG. 8(b) and those to fade out shown in FIG. 8(c) are given from the controller 6, output music signals through the fading circuit 20 have a shape shown in FIG. 8(d).

Accordingly, as to the fade-in instruction signal (b), a silencing process is applied for the period T1 (from $t_1$ to $t_2$) while the signal is on and following the end of the silencing process, an actual fade-in process is executed for a certain period of time T2 (from $t_2$ to $t_3$).

As to the fade-out instruction signal (c), a fade-out process is started immediately as the signal changes from "ON" to "OFF" at $t_4$ and it is controlled so as to complete the process for a certain period of time T4 (until $t_5$). If the fade-out instruction signal is successively on after the fade-out process is finished, the controller 6 controls so that a silencing process is applied for a period T5 (from $t_5$ to $t_6$) until the signal becomes "OFF".

The following description deals with input procedures for fade information to instruct the fade-in/fade-out process.

In entering fading information as additional information, after recording music programs, for example while continuously reproducing the above-mentioned music programs, the user may press a predetermined key of the operation key group 13 slightly before the part where he/she wants to apply the fade-in process to the music programs. By this action, it is controlled by the controller 6 that a value of the absolute address 22 at the time that the predetermined key of the operation key group 13 is pressed is stored in the TOC memory 11 as a silencing start position $t_1$ shown in FIG. 8, while a value of the absolute address 22 at the time that the pressing of the predetermined key is removed is stored in the TOC memory 11 as a fade-in start position $t_2$ in FIG. 8.

Figure 8:
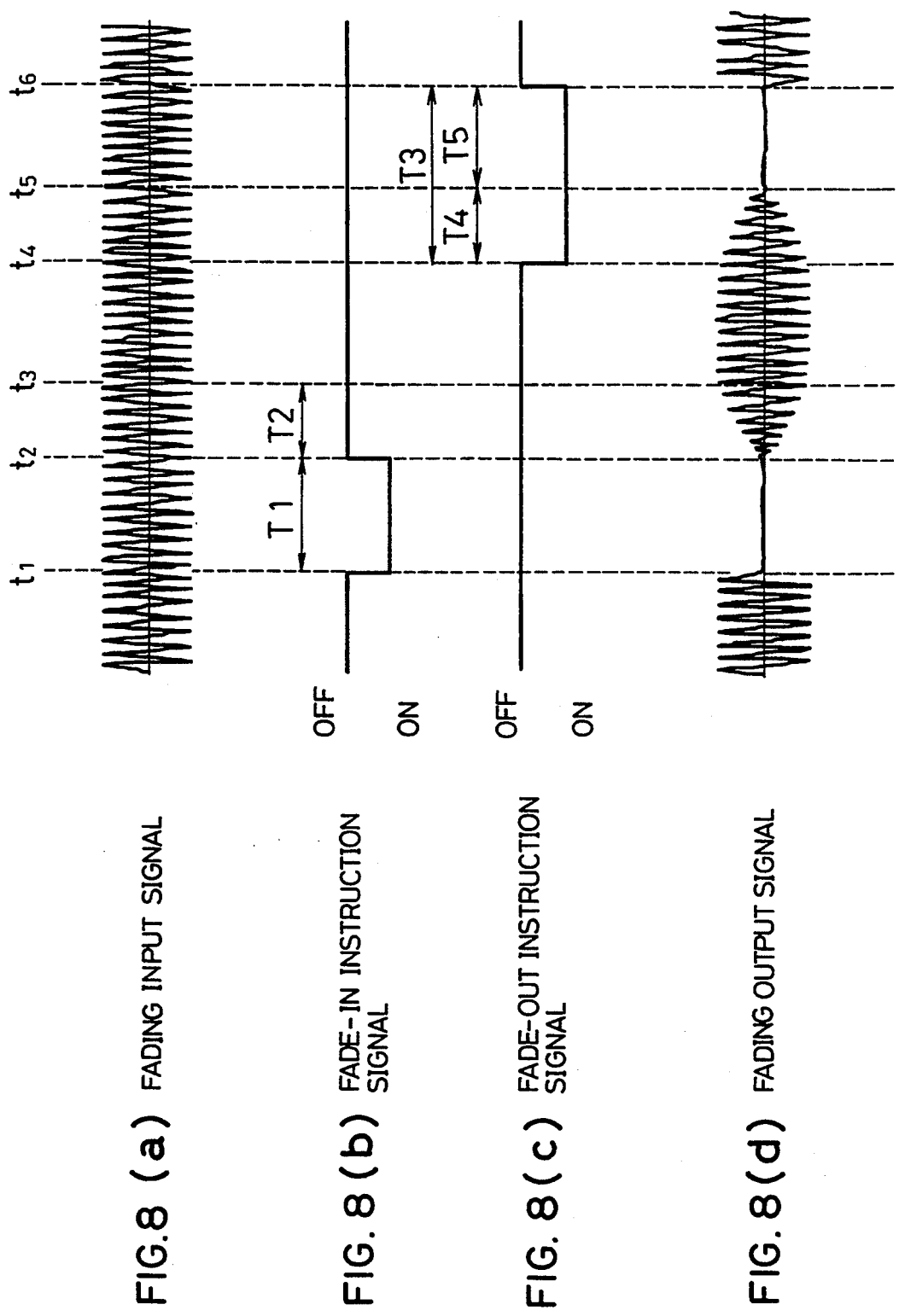

When the user presses a predetermined key of the operation key group 13 at the part where he/she wants to apply a fade-out process, it is also controlled by the controller 6 that a value of the absolute address 22 at the time that the predetermined key of the operation key group 13 is pressed is stored in the TOC memory 11 as a fade-out start position $t_4$ shown in FIG. 8, while a value of the absolute address 22 at the time that the pressing of the predetermined key is removed is stored in the TOC memory 11 as a silencing end position $t_6$.

In an actual operation of entering fading signals, as is mentioned in the input of silencing information in the first embodiment, an input operation in a short time is available by using combination of music-selecting, fast-sending and fast-rewinding functions. Moreover, since fade-in/fade-out instructions are given after recording music programs, if the operation should be failed, re-instructions would be given easily without any destruction of the recorded data in the program area 24.

Moreover, in the above-mentioned example, description is given on the case wherein fading information is entered while music programs are being reproduced, however information such as a recording start position for each melody etc. read from the TOC area 23 and stored in TOC memory 11 can be displayed on the display 12 and instructions for fade-in/fade-out can be given by entering values of the absolute addresses 22 showing positions to apply fade-in/fade-out operations by the operation key group 13.

Furthermore, in the case wherein the user instructs intervals between melodies and the like by the operation key group 13 and enters music numbers, recording start positions etc., instructions for fade-in/fade-out could be given simultaneously during the operations.

Once fading information is entered in any one of those ways shown above, in the reproduction on and after the input, the fading information stored in the TOC memory 11 is recognized by the controller 6 and by comparing it with values of the absolute addresses 22 successively reproduced, instructions for starting fade-in/fade-out operations or terminating them are given to the fading circuit 20. In this way, the fading circuit 20 performs the fade-in/fade-out operation as mentioned before.

In addition, the above-mentioned fading information is recorded in the TOC area 23 as additional information at a proper time according to instructions of the user etc.

By this system, fading information is kept in a disk even if it is taken out of the recording/reproducing device and since the information is read from the disk and stored in the TOC memory 11 when it is placed into the device next time, once fading information is entered, fade-in/fade-out processes in the same conditions can be obtained every time the disk is reproduced unless the information is cancelled or changed.

Next, an example for carrying out fade-in/fade-out processes is described practically as follows.

Figure 9:
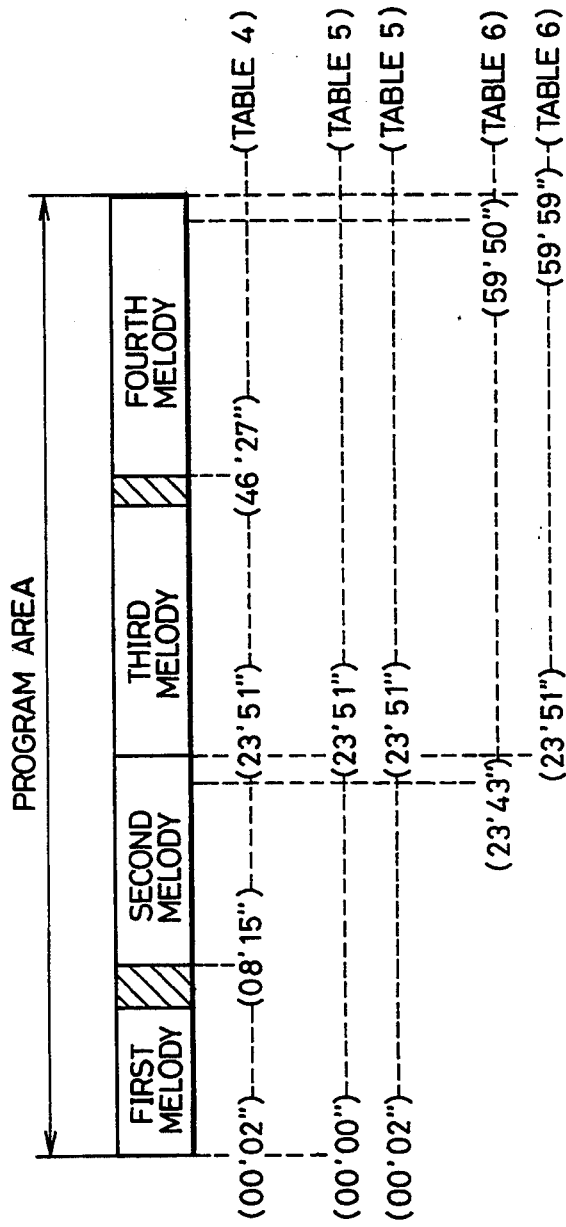
Figure 10:
FIG. 10 is a schematic illustration showing an example of recording conditions of music program in each program area.
Figure 11:
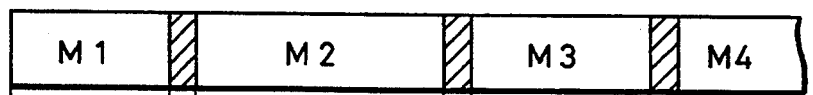
FIG. 11 (a)–11 (c) are schematic illustration showing examples of recording conditions of music programs in each program area.
Figure 11:
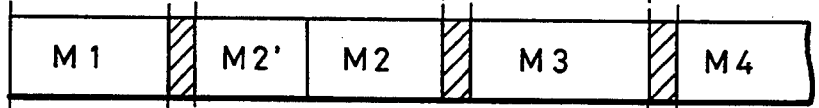
Figure 11:
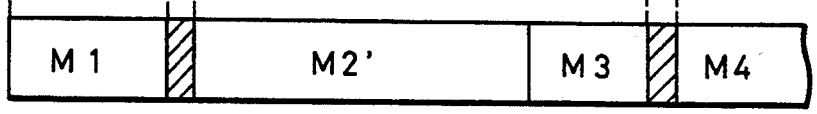
Figure 12:
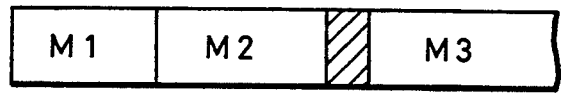
FIG. 12 is a schematic illustration showing an example of recording condition of music program in each program area.

If there are music programs recorded in the program area 24 as shown in FIG. 9, the number and recording start position for melody are recorded in the TOC area 23 as shown in Table 4 and these contents are read from the disk and stored in the TOC memory 11 when the disk is placed.

TABLE 4

| Melody Number | Recording Start Position |
| --- | --- |
| 1 | 00'02" |
| 2 | 08'15" |
| 3 | 23'51" |
| 4 | 46'27" |

Under recording conditions shown in FIG. 9, recordings for the first melody are started in the middle of information for a music source and there is hardly any pause time between the second melody and the third one. Moreover, recordings for the fourth melody are finished halfway on the melody because of the shortage of the disk's capacity.

Accordingly, in this case, for example the following fade-in/fade-out processes are performed. First, a fade-in process is applied to the beginning part of the first melody in order to get rid of displeased feelings due to lack of the head part of the first melody. Next, a fade-out process is applied to the ending part of the second melody in order to remove displeased feelings due to lack of enough pause time between the second melody and the third one while a fade-in process is applied to the beginning of the third melody. Then, a fade-out process is also applied to the ending part of the fourth melody so that displeased feelings due to the halfway finishing of music can be removed.

Table 5 as well as Table 6 shows fading information entered in TOC memory 11 to carry out the above-mentioned fade-in/fade-out processes.

TABLE 5

| No. | Silencing Start Position | Fade-in Start Position |
| --- | --- | --- |
| 1 | 00'00" | 00'02" |
| 2 | 23'51" | 23'51" |

TABLE 6

| No. | Fade-out Start Position | Silencing End Position |
| --- | --- | --- |
| 1 | 23'43" | 23'51" |
| 2 | 59'50" | 59'59" |

When the successive reproducing is started, a silencing process for fade-in for the first melody is started at the time (00'00") two seconds before the recording start position (00'02") for the first melody as shown in Table 5 and following the above operation, a fade-in process for the first melody is started at the recording start position (00'02") for the first melody. Accordingly, the volume of the reproduced sound is gradually increased at the beginning of the first melody, reaching the regular signal level in a certain amount of time. Then, when the program comes to the ending of the second melody, a fade-out process is started at the time (23'43"), eight seconds before the end position (23'51") of the second melody as shown in Table 6. By this process, the volume of the reproduced sound is gradually decreased, having the sound in a silence condition in five seconds, for example, and the silencing process is complete at the silencing end position (23'51"). Next, at the same position (23'51"), a fade-in process for the third melody is started as is shown in Table 5 to gradually increase the volume of the reproduced sound. Then, following the reproduction of the third melody, when it comes to the ending of the fourth melody, according to the contents of Table 6, a fade-out process is started at the time (59'50"), nine seconds before the end position (59'59") of the fourth melody, namely, the end position of the program area 24, having the sound in a silence condition, for example after five seconds. After that, the silencing process continues until the silencing end position (59'59") and the reproduction is complete according to the ending of the program area 24.

Moreover, in the above-mentioned embodiment, the start and end positions for the fade-in/fade-out processes are instructed as the fade information, however, instead of the method, the start position and the elapsed time may be used to give instructions.

As described above, a recording/reproducing device in accordance with the present invention performs recording as well as reproducing on a rewritable recording medium which comprises absolute addresses, an information recording region for recording sound information entered thereto from outside and a TOC area for recording additional information on the information recorded in the information recording region, and the device is composed of recording means which records silencing information for instructing to erase sound information in a desired range of the sound information recording region into the TOC area as additional information when sound information in the sound information recording region is reproduced, memory means which stores the silencing information read from the TOC area therein when the recording medium is placed in the device and silencing means which applies the silencing process to the range instructed by the silencing information stored in the memory means in reproducing the sound information.

In this composition, since the silencing process is applied to the range instructed by the silencing means according to the silencing information, reproducing of unnecessary sound information is avoidable in reproducing the sound information and, for example, proper period of pause time can be created among melodies.

Furthermore, the above-mentioned silencing information is recorded in the TOC area of a recording medium as additional information and kept in the recording medium even after taking the medium out of the device, and therefore the same silencing process is available in every reproduction of the recording medium until the above-mentioned silencing information is revised or removed. Accordingly, troublesome reinstructing is not necessary.

Another recording/reproducing device in accordance with the present invention performs recording as well as reproducing on a rewritable recording medium which comprises absolute addresses, an information recording region for recording sound information entered thereto from outside and a TOC area for recording additional information on the information recorded in the information recording region, and the device is composed of recording means which records fading information for instructing to apply fade-in/fade-out processes to desired positions adjacent recording start position for a fade-in process or recording end position for a fade-out process into the TOC area as additional information, memory means to store the fading information read from said TOC area when the recording medium is placed into the device and fading means to apply fade-in/fade-out processes according to the fading information recorded in said memory means in reproducing the sound information.

In this composition, since fade-in/fade-out processes can be applied to desired parts of music programs by the fading means according to the fading information when the sound information is reproduced, high quality music can be obtained and difficult adjusting operations for the volume during recording music programs are unnecessary.

Furthermore, above-mentioned fading information is also recorded in the TOC area of a recording medium as additional information and kept in the recording medium even after taking the medium out of the device, and therefore the same fade-in/fade-out process is available in every reproduction of the recording medium until the above-mentioned fading information is revised or removed. Accordingly, troublesome reinstructing is not necessary.

In the above-mentioned preferred embodiments, descriptions are given of a recording/reproducing device employing a magneto-optical disk with a format in use for CD's, however the scope of the present invention is not limited in using the format and a recording medium with any format besides CD format can be used if it comprises absolute addresses.

Moreover, the absolute addresses are recorded in a pit like shape in the preferred embodiments, but they can be recorded in other shapes.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A recording/reproducing device for recording data on and reproducing data from a rewritable recording medium including absolute addresses, an information recording region for recording information entered thereto from an external source, and a TOG area for recording reproduction information for said information recorded in said information recording region, said device comprising:

recording means for recording reproduction operation information in said TOC area as the reproduction information for controlling the reproduction of said information in said information recording region;

said reproduction operation information including tailored reproduction information, selected by an operator for controlling which of said information in the information recording region will be reproduced and proper pauses therebetween, wherein the tailored reproduction information controls the reproduction of said information recorded in said information recording region, until modified by the operator wherein said reproduction operation information is stored together in a first memory area of said TOC area separate from start and stop times of said information entered from the external source stored together in a second memory area of said TOC area;

memory means for storing said reproduction operation information read from said TOC area therein, stored together in the first memory area of said TOC area, separate from the start and stop times of said information entered from the external source stored together in the second memory area, after said rewritable recording medium is placed in said device; and reproduction operation means for performing the reproduction operations instructed by the reproduction operation information stored in said memory means in order to control the reproduction of the information in said information recording region.

2. The recording/reproducing device of claim 1, wherein said absolute addresses are formed on said rewritable recording medium so that a reflection factor of light varies due to a phase change.

3. The recording/reproducing device of claim 1, wherein said rewritable recording medium is an optical card or a magnetic tape.

4. The recording/reproducing device of claim 1, wherein said rewritable recording medium is a rewritable disk utilizing magneto-optics or phase change for recording and erasing.

5. The recording/reproducing device of claim 4, wherein said rewritable disk is provided with tracks thereon having spiral shape or concentric circle shape, said tracks including the absolute addresses in pit-like shape, the TOC area being located at an innermost region of the tracks and a program area being located at an outermost region of the TOC area.

6. The recording/reproducing device of claim 5, wherein the absolute addresses are spaced at intervals so that each of the absolute addresses is reproduced once every second at a predetermined linear velocity during reproduction.

7. The recording/reproducing device of claim 5, wherein the absolute addresses include a preamble for synchronization during reproduction, an address mark for indicating a head of the absolute addresses, an address number for showing an address which is incremented by one from an innermost track of the rewritable recording disk and an error detection code for detecting errors when the address number is detected.

8. The recording/reproducing device of claim 5, the information recorded in said TOC area and the program area including,
frame synchronous signals, data fields including,
24 bytes of data for music programs, and
8 parity bytes for error detection, and
sub-codes for recording melody numbers and time information in each of the data fields.

9. The recording/reproducing device of claim 1, further comprising input means for inputting the reproduction operation information selected by the operator.

10. The recording/reproducing device of claim 9, wherein the reproduction operation information is input during the reproduction of said information recorded in said information recording region.

11. The recording/reproducing device of claim 1, wherein the first memory area of said TOC area is removable from said recording/reproducing device.

12. A recording/reproducing device for recording and reproducing on a rewritable recording medium including absolute addresses, a sound information recording region for recording sound information entered thereto from an external source and a TOC area for recording reproduction information for said sound information recorded in said sound information recording region, said device comprising:

recording means for recording silencing information in the TOC area as the reproduction information, for erasing sound information within a desired time range when reproducing the sound information in the sound information recording region;

said silencing information including pause information representing pause times between melodies represented by the sound information in the sound information recording region and cancellation information indicating melodies represented by the sound information in the sound information recording region whose reproduction is disabled, wherein the pause information is selected by an operator and controls the pause between said sound information recorded in said sound information recording region until modified by the operator, wherein said silencing information is stored together in a first memory area of said TOC area, separate from start and stop times of said sound information entered from the external source, stored together in a second memory area in the TOC area;

memory means for reading the silencing information from the TOC area stored together in the first memory area of said TOC area, separate from the start and stop times of said sound information entered from the external source stored together in the second memory area, after said recording medium is placed in the device and storing the silencing information; and silencing means for performing silencing operations for a time duration determined by the silencing information stored in said memory means when reproducing the sound information.

13. The recording/reproducing device of claim 12, wherein said recording means includes
an optical head which applies a light beam to a magneto-optical disk for recording or reproducing information stored therein and
a magnetic coil for applying external magnetic fields, according to the sound information to said magneto-optical disk.

14. The recording/reproducing device of claim 12, wherein said memory means includes a readable and writable TOC memory in which data read from the TOC area are stored.

15. The recording/reproducing device of claim 12, wherein said silencing means includes
a controller for controlling the recording/reproducing device, and
a muting circuit for performing the silencing operations in accordance with the silencing information received from the controller during the reproduction of music programs.

16. The recording/reproducing device of claim 15, further comprising:

a D/A converter for converting digital data sequences into analog signals;

said muting circuit performing the silencing operations on the analog signals in accordance with the silencing information and outputting the analog signals.

17. The recording/reproducing device of claim 15, said muting circuit performing the silencing operations on digital data sequences in accordance with the silencing information and outputting the silenced digital data sequences;

said device further comprising:

a D/A converter for receiving and converting the silenced digital data sequences into analog signals and outputting the analog signals.

18. The recording/reproducing device of claim 12, wherein said silencing information includes, silencing start position information and silencing time information determined by a value of an absolute address which is reproduced at the time silencing instructions are provided.

19. The recording/reproducing device of claim 12, further comprising input means for inputting the pause information selected by the operator.

20. The recording/reproducing device of claim 19, wherein the pause information is input during the reproduction of said sound information recorded in said sound information recording region.

21. The recording/reproducing device of claim 12, wherein the first memory area of said TOC area is removable from said recording/reproducing device.

22. A method for entering silencing information to a recording/reproducing device during reproduction of a series of musical programs, comprising the steps of:

a) receiving silencing information including pause information representing pause times between the series of musical programs and cancellation information indicating certain musical programs in the series of musical programs whose reproduction is disabled, wherein the silencing information is stored together in a first memory area of a TOC area, separate from start and stop times of the series of musical programs stored together in a second memory area of the TOC area, and wherein the pause information is selected by an operator and controls the pauses between the series of musical programs until modified by the operator;

b) receiving a first absolute address reproduced when an operation key is activated and storing the first absolute address in a TOC memory as a silencing start position; and c) receiving a second absolute address reproduced when the operation key is deactivated and storing the second absolute address in the TOC memory as a silencing end position wherein the series of musical programs are reproduced in accordance with the silencing start position and the silencing end position.

23. The method of claim 22, further comprising the step of inputting the pause information selected by the operator.

24. The method of claim 23, wherein the pause information is input during the reproduction of the series of musical programs.

25. The method of claim 16, wherein the first memory area of the TOC area is removable from the recording/reproducing device.

26. A method for performing a silencing operation in a recording/reproducing device comprising the steps of:

a) receiving silencing information including pause information representing pause times between melodies represented by sound information stored in a sound information region and cancellation information indicating melodies represented by the sound information in the sound information region whose reproduction is disabled, wherein the silencing information is stored together in a first memory area of a TOC area, separate from start and stop times of the melodies represented by said sound information, stored together in a second memory area of the TOC area, and wherein the pause information is selected by an operator and controls the pause between the sound information recorded in the sound information recording region until modified by the operator;

b) receiving a reproduced absolute address during reproduction of information recorded on a rewritable recording medium and determining if the reproduced absolute address is a silencing start position as specified by the silencing information stored in the TOC area of the rewritable recording medium;

c) initiating a silencing operation to be performed by a muting circuit if the reproduced absolute address is equal the silencing start position;

d) determining whether there is additional recorded information on the rewritable recording medium to be reproduced;

e) terminating the reproduction if there is no additional recorded information to be reproduced; and f) continuing the reproduction if there is additional recorded information to be reproduced.

27. The silencing method of claim 26, said step (e) including the sub-steps of:

(e) (1) receiving a subsequent reproduced absolute address and determining if the subsequent reproduced address is equal to a silencing end position; and (e) (2) continuing the reproduction if the subsequent reproduced absolute address is equal to the silencing end position.

28. The silencing method of claim 26, said step (e) including the sub-steps of:

(e) (1) suspending the reproduction for a predetermined period of time corresponding to a silencing time stored in the TOC area of the recording medium;

(e) (2) receiving a subsequent reproduced absolute address determining if the subsequent reproduced absolute address is equal to the silencing end position; and (e) (3) continuing the reproduction if the subsequent reproduced absolute address is equal to the silencing end position.

29. The silencing method of claim 28, wherein sub-step (e) (1) is a pause action initiated by a track-jump once every revolution of the recording medium.

30. The method of claim 26, further comprising the step inputting the pause information selected by the operator.

31. The method of claim 36, wherein the pause information is input during the reproduction of the melodies.

32. The method of claim 26, wherein the first memory area of the TOC area is removable from the recording/reproducing device.

33. A recording/reproducing device for recording and reproducing a rewritable recording medium including absolute addresses, a sound information recording region for recording sound information entered thereto from an external source and a TOC area for recording reproduction information on said sound information recorded in said sound information recording region, said device comprising:

recording means for recording fading information in said TOC area as the reproduction information, the fading information including a recording start position, a fade-in start position, a fade-in duration, a fade-out start position, a fade-out duration, and a recording end position, selected by an operator for controlling an interval between said sound information recorded in said sound information recording region, wherein the fading information is stored together in a first memory area of said TOC area, separate from start and stop times of said sound information entered from the external source stored together in a second memory area in the TOC area, and wherein the fading information controls the interval between said sound information during reproduction until modified by the operator;

memory means for storing the fading information read from said TOC area stored together in the first memory of said TOC area separate from the start and stop times of said sound information entered from the external source stored together in the second memory area, after the rewritable recording medium is placed in said device; and fading means for performing fade-in and fade-out operations according to the fading information stored in said memory means.

34. The recording/reproducing device of claim 33, said recording means including an optical head which applies a light beam to a magneto-optical disk for recording or reproducing information stored therein, and a magnetic coil for applying external magnetic fields, according to the sound information to the magneto optical disk.

35. The recording/reproducing device of claim 33, wherein said memory means includes a rewritable TOC memory in which data read from the TOC area is stored.

36. The recording/reproducing device of claim 33, said fading means including a controller for controlling said device, and a fading circuit for performing the fade-in and fade-out operations according to the fading information received from the controller during the reproduction of music programs.

37. The recording/reproducing device of claim 33, said fading information including, a fade-in start position, a fade-in duration, a fade-out start position, and a fade-out duration, the fade-in start position and fade-out start positions being equal to absolute addresses being reproduced at time when fading instructions are received during sound information reproduction.

38. The recording/reproducing device of claim 33, said fading information including absolute address information indicating when to execute operator entered fade-in and fade-out operations.

39. The recording/reproducing device of claim 33, fading information including information on fade-in and fade-out operations entered by a user during sound information recording.

40. The recording/reproducing device of claim 33, further comprising input means for inputting the fading information selected by the operator.

41. The recording/reproducing device of claim 40, wherein the fading information is input during the reproduction of said sound information recorded in said sound information recording region.

42. The recording/reproducing device of claim 40, wherein the first memory area of said TOC area is removable from said recording/reproducing device.

43. A method for entering fading information to a recording/reproducing device during reproduction of a series of music programs, comprising the steps of:

(a) receiving a first absolute address reproduced when a first operation key is activated and storing the first absolute address in a TOC memory as a silencing start position;

(b) receiving a second absolute address reproduced when the first operation key is deactivated and storing the second absolute address in the TOC memory as a fade-in start position;

(c) receiving a third absolute address reproduced when a second operation key is activated and storing the third absolute address in the TOC memory as a fade-out start position; and (d) receiving a fourth absolute address reproduced when the second operation key is deactivated and storing the fourth absolute address in the TOC memory as a silencing end position;

wherein the fade-in start position and fade-out start position are selected by an operator for controlling an interval between the series of music programs, wherein the fading information is stored together in a first memory area of the TOC memory separate from start and stop times of the series of music programs stored together in a second memory area of the TOC memory, and wherein the fading information controls the interval between the series of music programs during reproduction until modified by the operator.

44. The method of claim 43, further comprising the step of inputting the fade-in start position and fade-out start position selected by the operator.

45. The method of claim 44, wherein the fade-in start position and fade-out start position is input during the reproduction of the series of music programs.

46. The method of claim 43, wherein the first memory area of the TOC area is removable from the recording-/reproducing device.

47. A method for performing fade-in and fade-out operations using fading information in a recording/reproducing device comprising the steps of:

(a) performing silencing operations when fade-in signals are on, wherein the fade-in signals are selected by an operator for controlling an interval between sound information recorded in a sound information recording region, wherein the fading information is stored together in a first memory area of a TOC memory separate from start and stop times of the sound information stored together in a second memory area of the TOC memory, and wherein the fading information controls the interval between the sound information, until modified by the operator;

(b) performing fade-in operations after the silencing operations;

(c) determining whether fade-out signals are on;

(d) performing fade-out operations when fade-out signals are on; and (e) performing silencing operations until the fade-out signal are off, after the fade-out operations are complete.

48. The method of claim 47, further comprising the step of inputting the fade-in signals selected by the operator.

49. The method of claim 48, wherein the fade-in signals are input during reproduction of the sound information.

50. The method of claim 47, wherein the first memory area of the TOC area is removable from the recording-/reproducing device.

* * * * *